(12) United States Patent
Metke et al.

(10) Patent No.: US 10,721,608 B2
(45) Date of Patent: Jul. 21, 2020

(54) PROFILES IN DEPLOYABLE WIRELESS COMMUNICATIONS SYSTEMS

(71) Applicant: MOTOROLA SOLUTIONS, INC., Chicago, IL (US)

(72) Inventors: Anthony R. Metke, Naperville, IL (US); Thomas S. Messerges, Schaumburg, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/844,177

(22) Filed: Dec. 15, 2017

(65) Prior Publication Data

US 2019/0191289 A1 Jun. 20, 2019

(51) Int. Cl.
| | |
|---|---|
| *H04W 4/90* | (2018.01) |
| *H04W 12/00* | (2009.01) |
| *H04W 12/08* | (2009.01) |
| *H04W 12/10* | (2009.01) |
| *H04W 8/22* | (2009.01) |
| *H04W 16/18* | (2009.01) |
| *H04W 88/06* | (2009.01) |
| *H04W 8/18* | (2009.01) |
| *H04W 8/20* | (2009.01) |

(Continued)

(52) U.S. Cl.
CPC .............. *H04W 4/90* (2018.02); *H04W 8/22* (2013.01); *H04W 12/0023* (2019.01); *H04W 12/0027* (2019.01); *H04W 12/08* (2013.01); *H04W 12/10* (2013.01); *H04W 16/18* (2013.01); *H04L 63/0428* (2013.01); *H04W 8/18* (2013.01); *H04W 12/06* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 7,925,712 B2 | 4/2011 | Bowers et al. | |
| 8,078,741 B2 | 12/2011 | Barnfield et al. | |
| 9,398,452 B1 * | 7/2016 | Upp .................... | H04W 12/04 |

(Continued)

FOREIGN PATENT DOCUMENTS

CA  2894990 A1  12/2016

OTHER PUBLICATIONS

ISA/EP, International Search Report and Written Opinion, dated Feb. 11, 2019, re PCT International Patent Application No. PCT/US2018/063230.

*Primary Examiner* — Mohammed Rachedine
(74) *Attorney, Agent, or Firm* — Perry + Currier Inc.

(57) ABSTRACT

A deployable wireless communications system includes memory, an antenna, and a processor connected to the memory and the antenna. The processor is configured to execute instructions to control the antenna to provide a deployable wireless network to wireless communications devices and to provide access for the wireless communications devices to the deployable wireless network according to profiles of each of the plurality of wireless communications devices stored in the memory. The system further includes an import service executable by the processor to import into the memory a profile carried by a wireless communications device. The profile is to provide access for the wireless communications device to the deployable wireless network.

19 Claims, 6 Drawing Sheets

(51) Int. Cl.
*H04W 12/06* (2009.01)
*H04L 29/06* (2006.01)

(56) References Cited

U.S. PATENT DOCUMENTS

| | | |
|---|---|---|
| 9,451,098 B2 | 9/2016 | Zhu et al. |
| 9,572,016 B2 | 2/2017 | Cormier et al. |
| 9,723,481 B2 | 8/2017 | Schell |
| 2005/0108297 A1 | 5/2005 | Rollin et al. |
| 2012/0170468 A1* | 7/2012 | La Macchia ............ H04L 47/24 370/252 |
| 2013/0157673 A1 | 6/2013 | Brusilovsky |
| 2015/0072628 A1* | 3/2015 | Mackie .................... H01Q 9/18 455/77 |
| 2016/0127340 A1 | 5/2016 | Upp et al. |
| 2019/0053050 A1* | 2/2019 | Jin ........................ H04L 9/3234 |

\* cited by examiner

PROFILES IN DEPLOYABLE WIRELESS COMMUNICATIONS SYSTEMS

BACKGROUND

Deployable systems are often used to facilitate communications in emergencies or other incidents, during which normal communications infrastructure may not be functioning correctly. A typical deployable system may be transported to the scene of an emergency or other incident and may be used by first responders or other individuals at the scene. Deployable systems are useful in incident management and may reduce the impact of an incident when used effectively.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
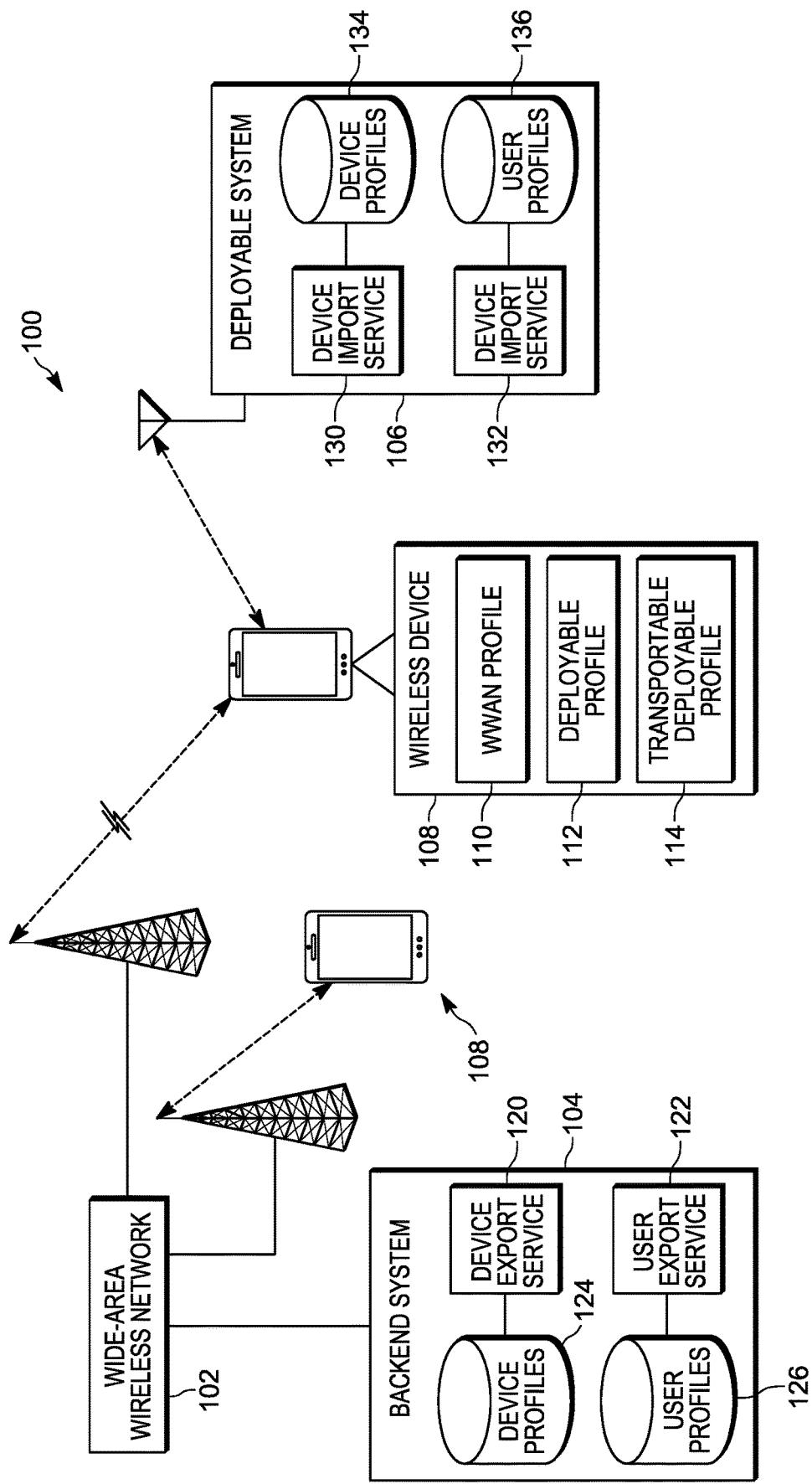
FIG. 1 is a block diagram of a communications system for provisioning a device on a deployable system according to an embodiment.

Elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows a communications system 100 according to an embodiment. The system 100 includes a wireless wide-area network (WWAN) 102, a backend system 104, and a deployable wireless communications system 106. The system 100 further includes a plurality of wireless communications devices 108. The wireless communications devices 108 may connect to the WWAN 102 to mutually communicate, with devices and networks outside the WWAN 102, and to access services, including services provided by the backend system 104.

It may be that a wireless communications device 108 becomes unable to communicate with the WWAN 102 or the backend system 104. This may be a result of a natural disaster or incident affecting the infrastructure of the WWAN 102 or the backend system 104, a human-caused disaster or incident, a technical fault of the WWAN 102 or backend system 104, a range limitation of the WWAN 102, or similar incident. In such cases, the deployable wireless communications system 106 may be deployed and the wireless communications device 108 may connect to the deployable wireless communications system 106 for communications and access to services. The deployable system 106 may be configured to replace lost services of the WWAN 102 and/or backend system 104. The deployable wireless communications system 106 may be compact and transportable, so that it may be quickly and readily deployed to any affected location. For example, the deployable system 106 may fit within an emergency services or law enforcement vehicle or trailer. Any number of deployable wireless communications system 106 may be used for any given incident.

The WWAN 102 may include a cellular or mobile network, such as the kind provided by a commercial wireless carrier. The WWAN 102 may include radio/microwave transceivers to wirelessly communicate with the wireless communications devices 108, a core network, switches, gateways, and other network infrastructure. The WWAN 102 may provide access to other networks, such as the backend system 104, other WWANs, local-area networks, the internet, and similar. Examples of WWANs 102 include networks using technologies such as Long-Term Evolution (LTE), Worldwide Interoperability for Microwave Access (WiMAX), Evolved High Speed Packet Access (HSPA+), Universal Mobile Telecommunications System (UMTS), second-generation/third-generation (2G/3G) General Packet Radio Service (GPRS), and similar.

The backend system 104 may be configured to provide services to the wireless communications devices 108 via the WWAN 102. Examples of services include messaging, email, data storage and retrieval, mapping, image/video storage and retrieval, voicemail, push-to-talk, calendaring, database access, and similar. The backend system 104 may be operated by an emergency services or law enforcement organization, for example.

The wireless communications devices 108 may be mobile phones, smartphones, tablet computers, notebook computers, portable radios, or similar devices. Each wireless communications device 108 stores a WWAN profile 110 to access the WWAN 102. The WWAN profile 110 may be specific to the network 102 and may be stored in a Subscriber Identity Module (SIM), Universal Subscriber Identity Module (USIM), Universal Integrated Circuit Card (UICC), or similar, which may be implemented physically as a removable memory card (e.g., a SIM/USIM/UICC card) or as data in non-removable memory of the device 108. A WWAN profile 110 is provisioned to a device 108 when that device 108 is to be used on the WWAN 102. In normal operation, the device 108 uses the WWAN profile 110 for communications and access to services. If the WWAN profile 110 needs to be updated or modified, this may be readily done by the operator of the network 102.

The deployable wireless communications system 106 includes a cellular or mobile network radio/microwave transceiver to wirelessly communicate with the wireless communications devices 108 and may implement other infrastructure to provide wireless communications and other services to the device 108. The deployable system 106 may be configurable to provide access to other networks, such as the backend system 104, other WWANs, local-area networks, the internet, and similar, depending on whether connections to these networks are available and whether these networks are operable. The deployable system 106 may operate as a standalone or "island" system that is not connected to another system, which may be the case during an emergency incident. The deployable system 106 may be implemented with technologies such as LTE, WiMAX, HSPA+, UMTS, 2G/3G GPRS, and similar.

The deployable wireless communications system 106 may be configured to provide services to wireless communications devices 108 including messaging, email, data storage and retrieval, mapping, image/video storage and retrieval, voicemail, push-to-talk, calendaring, database access, and similar. Such services may be independent of any services provided by the backend system 104.

Each wireless communications device 108 may be provided with a deployable profile 112 to grant and control access to the deployable system 106. The deployable profile 112 may be specific to the deployable system 106 and may be stored in a SIM/USIM/UICC or similar, which may be implemented as a removable memory card or as data in non-removable memory of the device 108. The deployable profile 112 may be stored in the same memory as the WWAN profile 110. Alternatively, two physical SIM/USIM/UICC or similar cards may be provided to the device 108, one for each profile 110, 112. The deployable profile 112 is distinct from a WWAN profile 110, in that the WWAN profile 110 does not provide access to the deployable system 106 and the deployable profile 112 does not provide access to the WWAN 102.

Each wireless communications device 108 may further store a transportable deployable profile 114. The transportable deployable profile 114 may contain data similar or identical to data contained in the deployable profile 112. The transportable deployable profile 114 may be considered a transportable version of the deployable profile 112, in that the device 108 uses the deployable profile 112 to communicate with the deployable system 106 and transports its deployable profile 114 to the deployable system 106 to facilitate such communication. A device 108 cannot typically extract data stored in a SIM/USIM/UICC, such as data in the deployable profile 112, to provide such data to the deployable system 106. Hence, the transportable deployable profile 114 is exported to the device 108 for import by the deployable system 106, so that the deployable system 106 obtains data that corresponds to the deployable profile 112 of the device 108 to effect communications between the deployable system 106 and the device 108.

A transportable deployable profile 114 may include a device profile, a user profile, or both. A device profile may define an identity for the wireless communications device 108 on the deployable system 106. Example device identity information includes an International Mobile Subscriber Identity (IMSI), a Mobile Equipment Identifier (MEID), a Mobile Station International Subscriber Directory Number (MSISDN), an International Mobile Equipment Identity (IMEI), a telephone number, and similar unique identifier. A device profile may further define network access credentials, such as a device's cryptographic key, an authentication key (e.g., Ki), and similar. The corresponding deployable profile 112 of the device 108, for example as stored in a SIM/USIM/UICC, contains similar or identical data.

A transportable deployable profile 114 may be encrypted and digitally signed by the backend system 104 to provide security and establish trust when a device 108 presents a transportable deployable profile 114 to a deployable system 106. A transportable deployable profile 114 may be assigned a validity period. For example, start and end times may be associated with a transportable deployable profile 114 and the start and end times may be checked against a current time prior to using the transportable deployable profile 114. A validity period may enhance security, in that compromised transportable deployable profiles 114 would only pose a risk for a limited time. Further, a validity period may also be used to enforce a scheduled scheme to export current transportable deployable profiles 114 to devices 108.

A user profile included in a transportable deployable profile 114 may define application access information for a user of the wireless communications device 108. Example user profile information includes a username, a password, a hash, a user's cryptographic key, biometric information, user roles, access permissions, preferences, personal information (e.g., name, telephone number, email address), and similar. In this embodiment, the deployable profile 112 of the device 108, for example as stored in a SIM/USIM/UICC, does not contain these types of user profile data.

During the normal course of events, it is expected that the deployable profile 112 is used only when the deployable system 106 has been deployed, such as during an emergency incident. As such, use of the deployable profile 112 generally occurs less often than use of the WWAN profile 110. If profiles are provided to the deployable system 106 in advance, so that the deployable system 106 may authenticate and authorize access to wireless communications devices 108, there is a risk that any number of the profiles may be outdated, invalid, or missing for devices 108 that are relatively new to the system 100. For example, profiles pre-loaded in the deployable system 106 may be associated with expired cryptographic keys or certificates, may be associated with devices 108 no longer is use, may be associated with users who no longer use devices 108, or may be absent for devices 108 that have come into use since the profiles pre-loaded. In addition, various users carrying various devices may or may not attend the scene of an incident causing even well-planned profile preloading to fail.

To mitigate the above problem, each wireless communications device 108 transports its transportable deployable profile 114 to the deployable system 106. The wireless communications device 108 obtains its transportable deployable profile 114 from the backend system 104 during normal operations, while the WWAN 102 is functioning normally. The transportable deployable profile 114 is stored on the device 108 in a non-useable form and the corresponding deployable profile 112 is not used. The transportable deployable profile 114 may be updated from time to time via the WWAN 102, particularly to capture changes in data of a user profile. Then, at the time of an incident, the wireless communications device 108 moves to the geographic region where the deployable system 106 has been deployed and brings with it a relatively current transportable deployable profile 114. The wireless communications device 108 sends the transportable deployable profile 114 to the deployable system 106, which then provisions the wireless communications device 108 and its user on the deployable system 106. The wireless communications device 108 and the deployable system 106 may then communicate on the basis of the transportable deployable profile 114 carried to the deployable system 106 and the deployable profile 112 already present at the wireless communications device 108. The wireless communications device 108 serves as the delivery mechanism for its profile on the deployable system 106. The deployable system 106 need not be pre-loaded with profiles that will potentially become stale. Moreover, any compatible wireless communications device 108 to be used with the deployable system 106 can bring its own transportable deployable profile 114, so that the absence of a corresponding pre-loaded profile is no longer a problem.

In this embodiment, the backend system 104 includes a device export service 120 and a user export service 122. The services 120, 122 may be Representational State Transfer (RESTful) services operating via Hyper Text Transfer Protocol Secure (HTTPS). The device export service 120 is coupled to a database of device profiles 124. The user export service 122 is coupled to a database of user profiles 126. The databases 124, 126 may store data representative of a set of devices and a set of users that could potentially be provisioned to the deployable system 106. Each wireless communications device 108 thus may obtain from the respective service 120, 122 its device profile and user profile, as one or more transportable deployable profiles 114, for future use by the deployable system 106. Transportable deployable profiles 114 are communicated to devices 108 through the WWAN 102. Hence, at any suitable time that a device 108 has connectivity to the backend system 104 through the WWAN 102, the device 108 may obtain a transportable deployable profile 114 in preparation for any future use of the deployable system 106.

Further, in this embodiment, the deployable system 106 includes a device import service 130 and a user import service 132. The services 130, 132 may be services accessible to wireless communications devices 108 via a local connection interface. Example local connection interfaces include a wired connection, such as a serial bus, a local wireless connection, such an Institute of Electrical and Electronics Engineers (IEEE 802.11) Wi-Fi network, deployable wireless networks that are configured to provide limited access to devices prior to importation of transportable deployable profiles, and deployable wireless networks in general for transmission of transportable deployable profiles 114 that contain user profile data and not device profile data, which is needed to connect to a deployable wireless network. The device import service 130 is coupled to a database of device profiles 134. The user import service 132 is coupled to a database of user profiles 136. The databases 134, 136 store data that are representative of devices and users that have been or will be provisioned on the deployable system 106. This data may represent a subset of devices and users stored in the databases 124, 126 at the backend system 104. When a wireless communications device 108 is to use the deployable system 106, the device 108 may provide to the respective service 130, 132 its device profile and user profile, as one or more transportable deployable profiles 114. Transportable deployable profiles 114 may be communicated to the deployable system 106 through the local connection interface, so that the transportable deployable profile 114 may then be used by the deployable system 106 to provision the device 108 to grant and control access of the device 108 to the wireless network provided by the deployable system 106.

To facilitate import and export of profiles, a profile stored in a database 124, 126, 134, 136 may be uniquely associated with a wireless communications device 108 through a unique identifier of the device 108, such as any of the aforementioned unique identifiers. Additionally or alternatively, a profile stored in a database 124, 126, 134, 136 may be uniquely associated with a user via user identity information, such as that discussed above.

In operation, a given wireless communications device 108 connects to the WWAN 102, and authenticates using its WWAN profile 110, so that it can communicate with other devices 108 and utilize services, including any services provided by the backend system 104. During such time, in accordance with any number of methodologies discussed herein, the wireless communications device 108 obtains a device profile, a user profile, or both (generally described as a transportable deployable profile 114) from an export service 120, 122 for potential future use with the deployable system 106. Should there be more than one different deployable system 106, the device 108 may obtain a corresponding transportable deployable profile 114 for each such deployable system 106. When the deployable system 106 is put into operation, such as during an emergency incident, and the wireless communications device 108 is to be used with the deployable system 106, then the device 108 transmits the transportable deployable profile 114 to the deployable system 106 through a locally connected import service 130, 132. The deployable system 106 may then use the transportable deployable profile 114 to provision the device 108 on the wireless network provided by the deployable system 106 and communications may be made on the basis of the deployable profile 112 at the device and the transportable deployable profile 114 provided to the deployable system 106. The device 108 may then be used wirelessly in conjunction with the incident.

Figure 2:
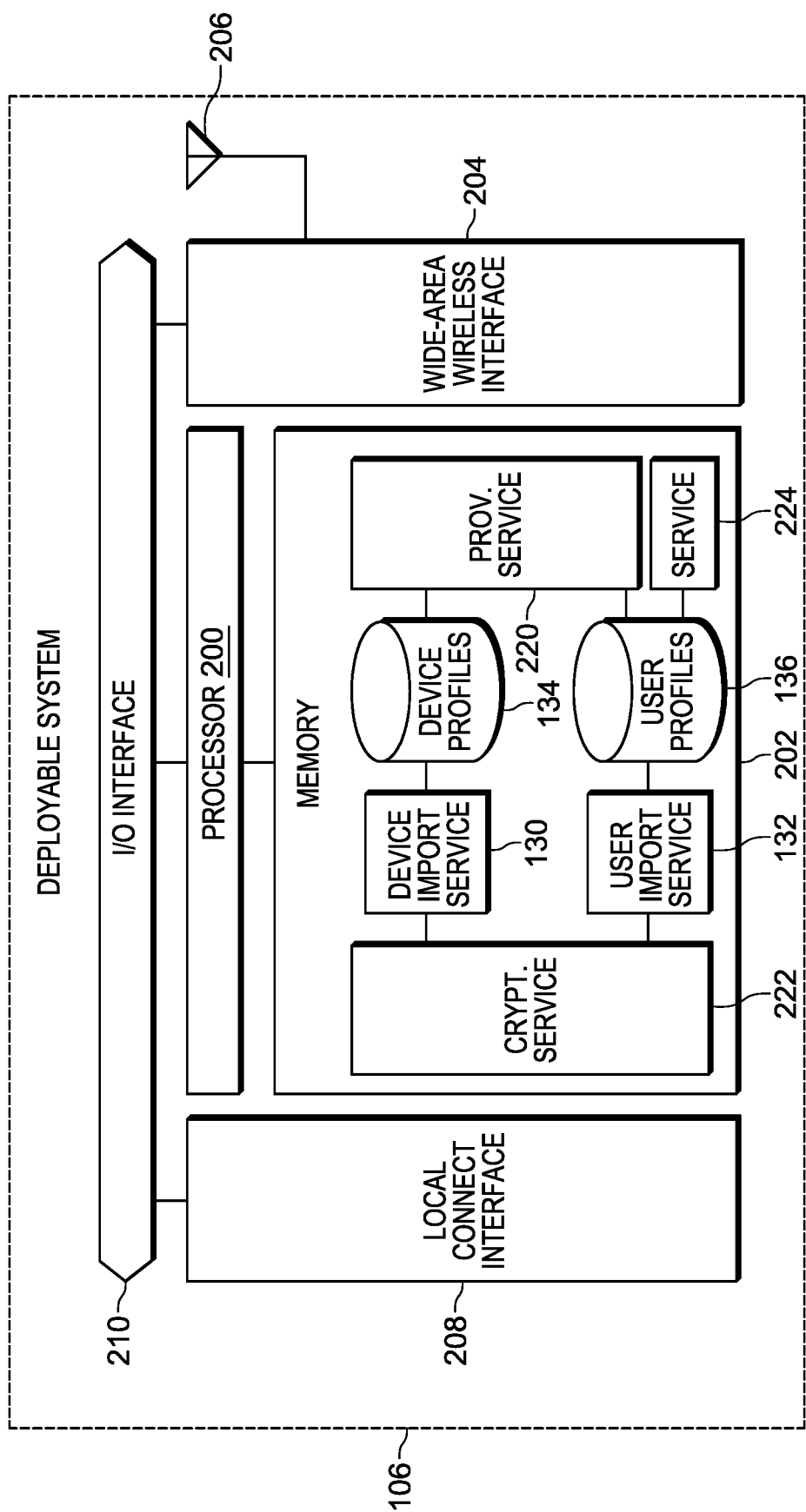
FIG. 2 is a block diagram of a deployable wireless communications system according to an embodiment.

FIG. 2 shows an embodiment of a deployable wireless communications system 106. The deployable system 106 includes a processor 200, memory 202, a wide-area wireless interface 204, an antenna 206, a local connection interface 208, and an input/output (I/O) interface 210. The I/O interface 210 may include a bus or similar subsystem to provide for communications among the components of the deployable system 106.

The processor 200 is connected to the memory 202 and the I/O interface 210. The processor 200 may include a central processing unit (CPU), a microcontroller, a microprocessor, a processing core, a field-programmable gate array (FPGA), or similar device capable of executing instructions. The processor 200 may cooperate with the memory 202 to execute instructions contained in the memory 202.

The memory 202 may include a non-transitory machine-readable storage medium that may be any electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions. The memory 202 may include volatile memory, non-volatile memory, or both.

The wide-area wireless interface 204 and antenna 206 may be connected to the I/O interface 210 to communicate with the other components of the deployable system 106. The wireless interface 204 and antenna 206 may implement a deployable wide-area wireless communications network, such as an LTE network, a WiMAX network, a HSPA+ network, a UMTS network, a GPRS network, or similar. Because the system 106 is deployable, its wide-area wireless communications network may include only one access point, namely, the wireless interface 204. However, it is contemplated that multiple deployable systems 106 may be linked to form a deployable wide-area wireless communications network having multiple access points provided by the multiple wireless interfaces 204.

The local connection interface 208 is distinct from the wide-area wireless interface 204 and antenna 206 and may include a Universal Serial Bus (USB) interface, a Wi-Fi interface, or similar wired or wireless local connection. The connection interface 208 may be considered a side channel through which data can be communicated with the deployable system without access to the wireless interface 204. This side channel may be secured by requiring physical access to the deployable system 106 or by a security scheme provided to the connection interface 208 (e.g., local username and password). The connection interface 208 and/or connection interface 204 is configured to communicate with a wireless communications device 108 to import its transportable deployable profile 114 as a condition for the wireless communications device 108 and/or its user to be provisioned on the deployable wide-area wireless network provided by the wireless interface 204 and antenna 206.

In other embodiments, import of transportable deployable profiles 114 may be facilitated via an open-service wide-area wireless network provided by the wide-area wireless interface 204 and antenna 206. An example of such is an open-service LTE network. Other kinds of deployable wireless networks that are configured to provide limited access to unknown devices may also be used. Further, the wide-area wireless interface 204 and antenna 206 may be used to communicate a transportable deployable profile 114 that contains user profile data and not device profile data that would be required to allow communications with the wide-area wireless interface 204 and antenna 206. In such embodiments, the connection interface 208 may be omitted.

The processor 200 is configured to execute instructions to control the antenna 206 and wireless interface 204 to provide a deployable wireless network and to control access to the deployable wireless network according to profiles 134, 136 stored in the memory 202.

The processor 200 is further configured to execute instructions to provide the device import service 130 and user import service 132 stored in the memory 202. The service 130, 132 is configured to import into the memory 202 device and/or user profiles carried by wireless communications devices 108.

The processor 200 is further configured to execute instructions to provide a provisioning service 220 that accesses the profile databases 134, 136 and provisions wireless communications devices 108 with the device and/or user profile brought by the device 108, so as to grant and control access of the device 108 to the deployable wireless network implemented by the wireless interface 204 and the antenna 206.

The processor 200 may further be configured to execute instructions to provide a cryptographic service 222 that may be configured to decrypt imported profiles for the import services 130, 132, to authenticate imported profiles by checking digital signatures of the profiles, or both. Authentication of an imported profile may be a condition to granting access to the respective device 108 to the wide-area deployable wireless network. In public-private cryptographic examples, the cryptographic service 222 may store or be configured to obtain a public key corresponding to a private key held by a backend system 104.

The processor 200 may further be configured to execute instructions to provide any number of services 224 operable via the deployable wireless network provided by the deployable system 106. Such service 224 may be linked to deployed user profiles 136. Examples of such services are discussed elsewhere herein and include email, database access, and the like. For example, a deployed user profile containing email account information may be required to provide an email service to a particular user of a device 108.

Figure 3:
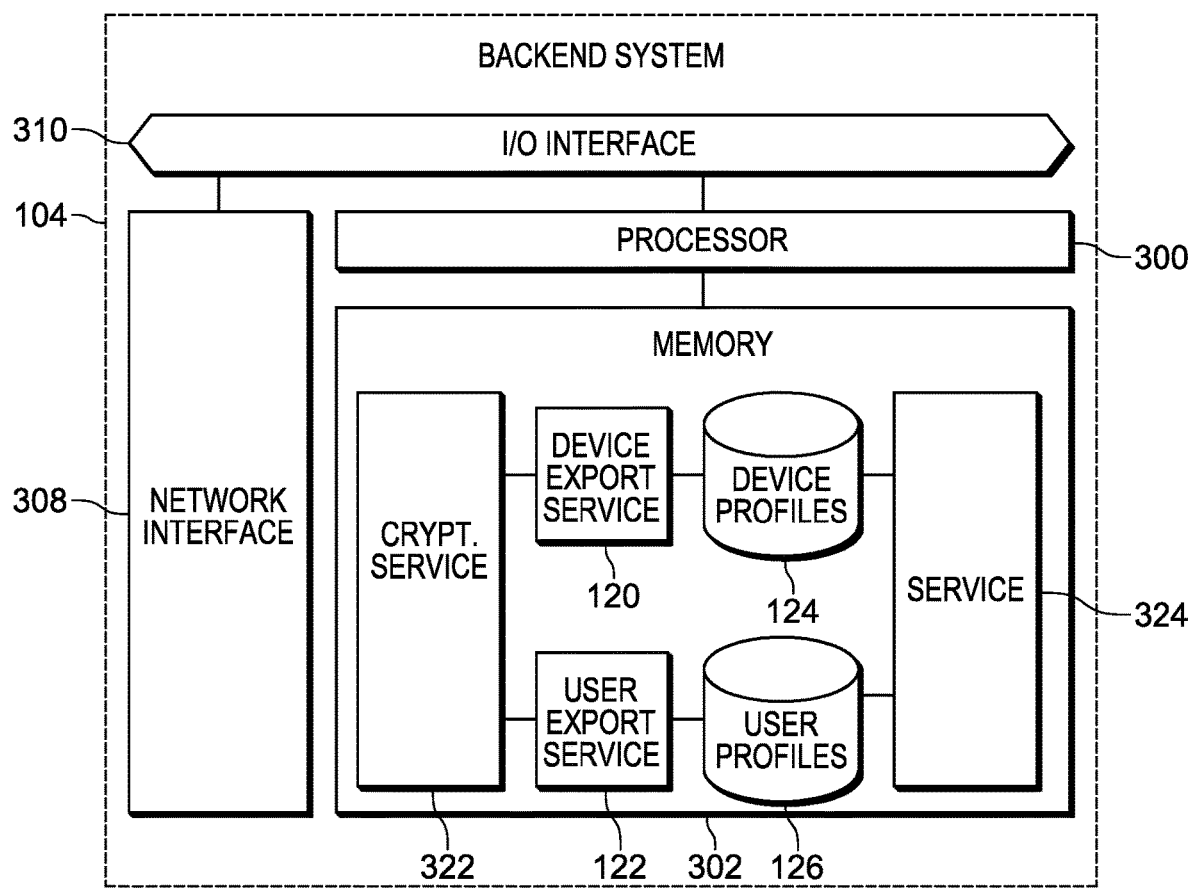
FIG. 3 is a block diagram of a backend system according to an embodiment.

FIG. 3 shows an embodiment of a backend system 104. The backend system 104 includes a processor 300, memory 302, a network interface 308, and an I/O interface 310. The I/O interface 310 may include a bus or similar subsystem to provide for communications among the components of the backend system 104.

The processor 300 is connected to the memory 302 and the I/O interface 310. The processor 300 may include any of the kinds of processors discussed elsewhere herein to cooperate with the memory 302 to execute instructions contained in the memory 302. The memory 302 may include a non-transitory machine-readable storage medium, such as a volatile memory, non-volatile memory, or both, of any of the kinds discussed elsewhere herein.

The network interface 308 may include any wired or wireless interface to connect the backend system 104 to a network, such as the WWAN 102, a network connected to the WWAN 102, the internet, or similar.

The processor 200 is configured to execute instructions to provide an export service, such as a device profile export service 120 and a user profile export service 122, to export from the memory 302 a transportable deployable profile 114 to a wireless communications device 108. The transportable deployable profile 114 may be one or more of a device profile and a user profile stored in respective databases 124, 126 to grant and control access of the device 108 to a deployable wireless network, such as that provided by a deployable system 106. The export service may be configured to export transportable deployable profiles 114 to devices 108 via network interface 308 and the WWAN 102 (FIG. 1).

In various embodiments, the export service 120, 122 may be configured to export transportable deployable profiles 114 automatically without user interaction. This may include a scheduled export process, an opportunistic export process, or similar. In an example scheduled export process, a transportable deployable profile is exported and transmitted to the respective device 108 according to a configurable schedule, such as once per week, once per day, the first of every month, or similar. In another example scheduled export process, a transportable deployable profile has an expiry time, and a replacement transportable deployable profile is exported and transmitted to the respective device 108 when the expiry time is reached. In an example opportunistic export process, a transportable deployable profile is exported and transmitted to the respective device 108 as triggered by the device meeting a specific criterion, such as connecting to the backend system 104, accessing a specific service provided by the backend system 104, and similar.

In various embodiments, the export service 120, 122 may be configured to export a transportable deployable profile in response to a user-initiated request received from the respective wireless communications device 108. That is, the devices 108 may be provided with an application or access to a website, through which users may obtain transportable deployable profiles.

The processor 200 is configured to execute instructions to provide a cryptographic service 322 that may be configured to encrypt transportable deployable profiles to be exported by the export services 120, 122, to digitally sign transportable deployable profiles for export, or both. Encryption of a transportable deployable profile may use a key that is not accessible to the device 108 by which the transportable deployable profile is to be ultimately used. As such, the transportable deployable profile may be rendered unintelligible to the device 108 that carries it. Such an encrypted transportable deployable profile is then decrypted by the deployable system 106 at time of provisioning. This may help increase security for the deployable system 106, should attempts be made to access a transportable deployable profile while it is being carried by a device 108. In a public-private key encryption scheme, the backend system 104 may use a public key to encrypt transportable deployable profiles and the deployable system 106 may be provided with a corresponding private key to decrypt profiles. Regarding digital signing of transportable deployable profiles, the backend system 104 may sign profiles for export using a private key and the deployable system 106 may authenticate imported profiles using the corresponding public key.

The processor 200 may further be configured to execute instructions to provide backend services 324 to wireless communications devices 108. Examples of such services are discussed elsewhere herein and include email, database access, and the like. Backend services 324 may be accessible to devices via WWAN profiles, deployable profiles, or both.

The backend services 324 and the services 224 provided by the deployable system 106 may be identical, may correspond, or may overlap. User profiles may provide user data to these services 324, 224, such as identity data, preferences, user contacts, talkgroup membership information, usernames, passwords, and the like. As such, it is advantageous for a transportable deployable profile 114 to be used to transport such data from the backend system 104 to the deployable system 106. Each user carries his or her own user profile data for use with the deployable system 106, should the need arise. In some implementations, users may experience a seamless or nearly seamless transition of services when activating their devices 108 on the deployable system 106.

Figure 4:
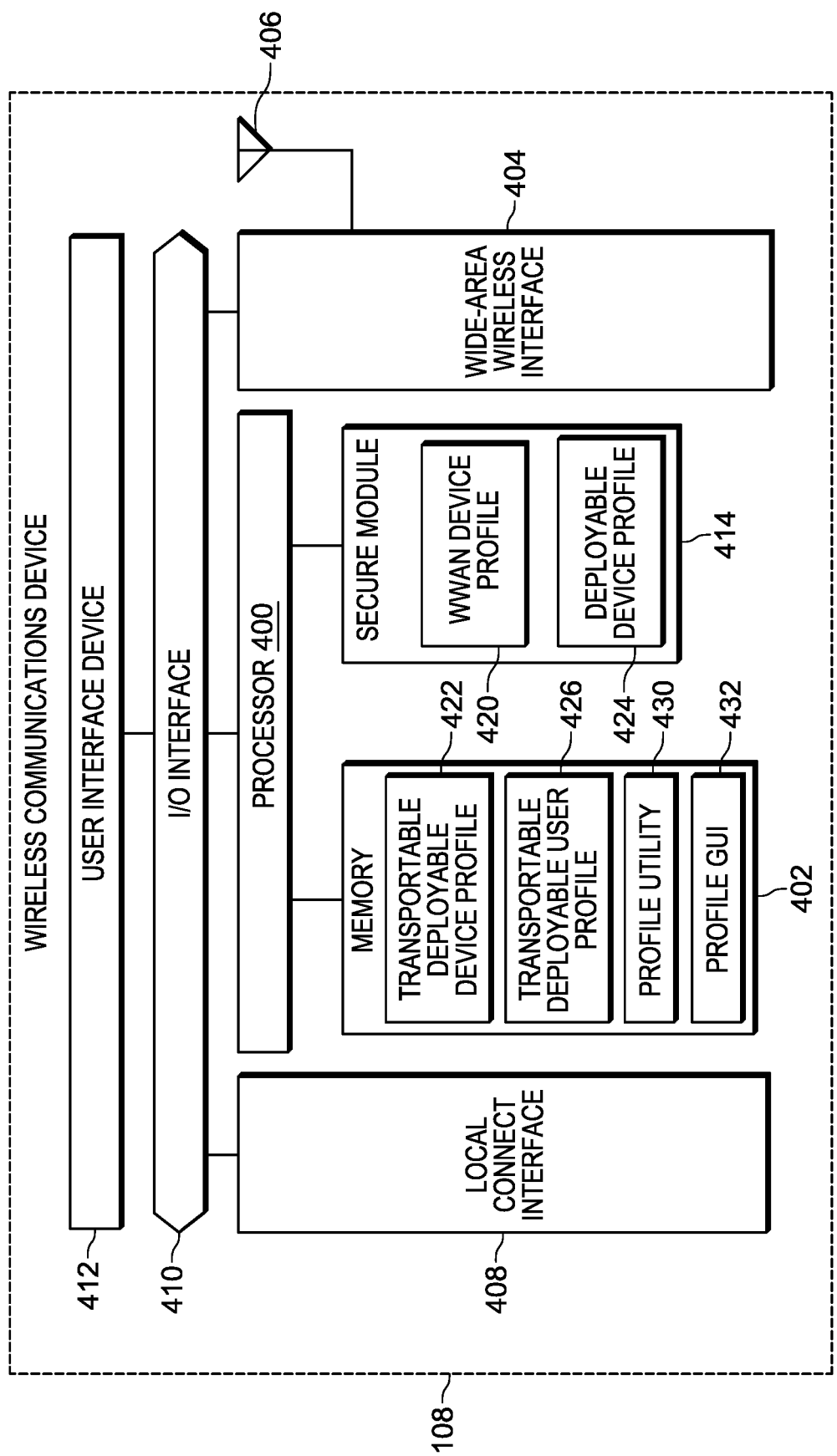
FIG. 4 is a block diagram of a wireless communications device according to an embodiment.

FIG. 4 shows an embodiment of a wireless communications device 108. The device 108 includes a processor 400, memory 402, a wide-area wireless interface 404, an antenna 406, a local connection interface 408, an I/O interface 410, a user interface device 412, and a secure module 414, such as a SIM/USIM/UICC. The I/O interface 410 may include a bus or similar subsystem to provide for communications among the components of the device 108.

The processor 400 is connected to the memory 402 and the I/O interface 410. The processor 400 may include any of the kinds of processors discussed elsewhere herein to cooperate with the memory 402 to execute instructions contained in the memory 402. The memory 402 may include a non-transitory machine-readable storage medium, such as a volatile memory, non-volatile memory, or both, of any of the kinds discussed elsewhere herein.

The wide-area wireless interface 404 and antenna 406 may be connected to the I/O interface 410 to communicate with the other components of the device 108. The wireless interface 404 and antenna 406 may be operable according to a technology such as LTE, WiMAX, HSPA+, UMTS, GPRS, or similar to connect with the WWAN 102 and the deployable wireless communications system 106.

The local connection interface 408 is connected to the I/O interface 410 and is distinct from the wide-area wireless interface 404 and antenna 406. The connection interface 408 may include a USB interface, a Wi-Fi interface, or similar wired or wireless local connection. The connection interface 408 is connectable to the connection interface 208 of the deployable system 106, so that a transportable deployable profile carried by the device 108 may be sent to the deployable system 106.

The user interface device 412 may be connected to the I/O interface 410 and may include a screen, a touchscreen, a button, a keyboard, a microphone, a speaker, and similar devices to provide for user interaction with the device 108.

The processor 400 is configured to execute instructions to control the antenna 406 and wireless interface 404 to access a wide-area network using a profile stored in the secure module 414. Such a profile is a WWAN device profile 420 when the device 108 is connected to the WWAN 102 and is a deployable device profile 424 when the device 108 is connected to a deployable system 106.

In this embodiment, the secure module 414 is a memory card separate from the memory 402. Such a card may be a SIM, USIM, UICC, or the like. The secure module 414 may be protected by an authentication protocol to prevent unauthorized access and its content, such as a profile stored therein, may be encrypted. In other embodiments, the secure module 414 is a portion of the memory 402 that may be encrypted and may have access controlled by an authentication protocol.

The secure module 414 may store a WWAN device profile 420 for use with the WWAN 102. The secure module 414 may further store a deployable device profile 424 for use with the deployable system 106. Further, any number of transportable deployable profiles may be stored in the memory 402 for transport to the deployable system 106. In this example, the memory 402 stores a transportable deployable device profile 422 and a transportable deployable user profile 426. Alternatively, the memory 402 may store a single transportable deployable profile that contains both the device and user profiles.

The processor 400 may further be configured to execute instructions to implement a profile utility 430. The profile utility 430 may be configured to receive a transportable deployable profile 422, 426 from a backend export service 120, 122 of the backend system 104, store the transportable deployable profile 422, 426 in the memory 402, and output the transportable deployable profile 422, 426 to the deployable system 106 when the device 108 is to be provisioned at the deployable system 106. When encryption is used, the profile utility 430 may be operable to receive, store, and output the transportable deployable profile 422, 426 as an encrypted block of data that is unintelligible to the device 108.

The processor 400 may further be configured to execute instructions to implement a graphical user interface (GUI) 432 to trigger a request for the transportable deployable profile 422, 426 from the backend export service 120, 122 of the backend system 104 in response to a user input at the user interface device 412. That is, when the backend system 104 is configured to allow user self-service of transportable deployable profile 422, 426, the user interface device 412 may render a self-service user interface and handle related user input.

The profile GUI 432 may additionally or alternatively allow for user initiation or confirmation of output of the transportable deployable profile 422, 426 to the deployable system 106. That is, prior to a transportable deployable profile 422, 426 being transmitted to the deployable system 106 by the side channel facilitated by the local connection interface 408, the GUI 432 and user interface device 412 may be used to initiate or confirm such transmission.

As mentioned elsewhere herein, the transportable deployable device profile 422 may be exported to the deployable system 106, so that the deployable system 106 and the device 108 may communicate on the basis of the profiles 422, 424. Further, the transportable deployable user profile 424 may be exported to the deployable system 106, so that the deployable system 106 may be provided with user preferences, credentials, and other user data for services to be used on the deployable system 106.

Figure 5:
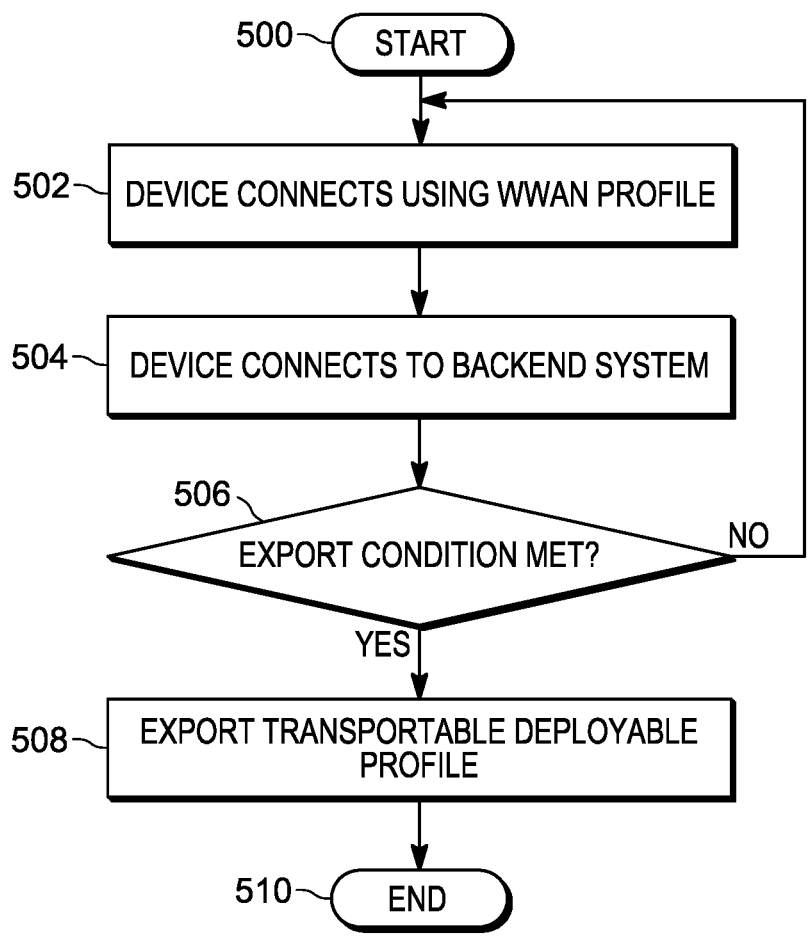
FIG. 5 is a flowchart of a method to export a transportable deployable profile to a wireless communications device according to an embodiment.

FIG. 5 shows a method for exporting a transportable deployable profile to a wireless communications device. The method may be used with any of the devices and systems described herein or with other devices and systems. The method may be implemented by processor-executable instructions. The method begins at block 500.

At block 502, a wireless communications device 108 connects to a WWAN 102 using a WWAN profile 110. The device 108 may be used normally to communicate with other devices 108 and to access services provided by the WWAN 102.

At block 504, the wireless communications device 108 connects to a backend system 104 via the WWAN 102. The device 108 may access services provided by the backend system 104.

At block 506, when the device 108 is connected to the backend system 104, a condition for exporting a transportable deployable profile 114 to the device 108 is checked. Example conditions include a device identity check, user identity check, schedule condition, an opportunistic condition, a user condition, and similar. A device identity check may include validating that the profile being exported is being sent to the device to which the profile belongs, for example, the device profile being exported is associated with a WWAN profile 110 already in the device 108. A user identity check may include validating that the profile being exported belongs to the user of the device receiving the profile. A schedule condition may include the backend system 104 comparing an export time against an actual time. The schedule condition is met when the actual time meets or exceeds the export time. The export time may be a day of the week, a day of the month, a frequency, an expiry time of a previously exported transportable deployable profile 114, or similar. An opportunistic condition may include the backend system 104 triggering export when the device 108 accesses a particular service, where such service may or may not be directly related to transportable deployable profile export. A user condition may include the backend system 104 receiving a user-initiated request from the device 108 to obtain a transportable deployable profile.

If the export condition is met, at block 508, the transportable deployable profile 114 for the device 108 is exported to the device 108 and the method ends at block 510. If the export condition is not met, then the method repeats. Prior to export, the transportable deployable profile 114 may be assigned a validity period, encrypted, and digitally signed. The method may be repeated continuously for any number of wireless communications devices 108 to continuously export updated transportable deployable profiles 114 to the devices 108.

Further concerning encryption, when multiple deployable systems 106 are to be used by an entity, such as an emergency services agency, each deployable system 106 may be given a unique private key. At block 508, encryption of transportable deployable profiles 114 would be performed using the corresponding public keys. Further, encryption of transportable deployable profiles 114 may also include using a symmetric key to obtain encrypted data that is then further encrypted using the corresponding public keys.

Alternatively, transportable deployable profiles 114 may be encrypted in transit. Export at block 508 may include use of an HTTPS link. Transportable deployable profiles 114 may be in the clear or encrypted by a key shared by the entity's deployable systems 106.

Figure 6:
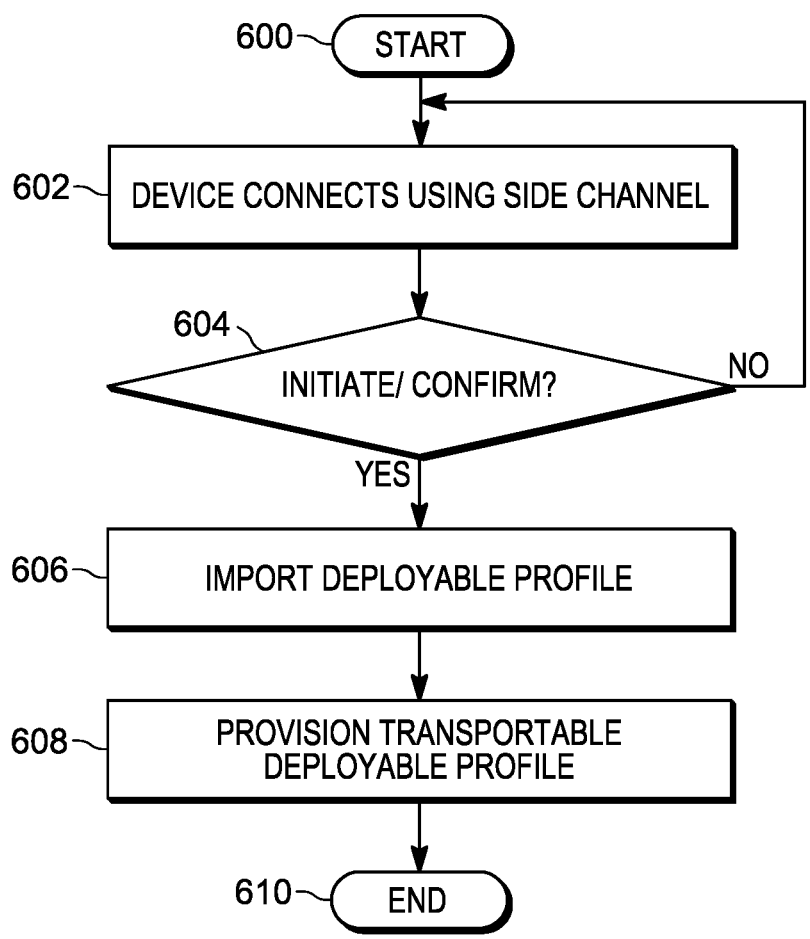
FIG. 6 is a flowchart of a method to import a transportable deployable profile to a deployable system according to an embodiment.

FIG. 6 shows a method of importing a transportable deployable profile into a deployable wireless communications system. The method may be used with any of the devices and systems described herein or with other devices and systems. The method may be implemented by processor-executable instructions. The method begins at block 600.

At block 602, a wireless communications device 108 carrying a transportable deployable profile 114 connects to a deployable wireless communications system 106 that has been deployed, for example, in response to an incident that affects a WWAN 102 that the device 108 would normally use. As the device 108 has not yet been provisioned on the wide-area wireless network operated by the deployable system 106, the connection of the device 108 to the deployable system 106 may be via a side channel provide by a local connection interface, such as a USB or Wi-Fi interface, or another connection, such as an open-service LTE network connection.

At block 604, initiation, confirmation, or both initiation and confirmation of transfer of the transportable deployable profile 114 from the device 108 to the deployable system 106 may be performed by either or both of the device 108 and the deployable system 106. For example, a user of the device 108 may initiate transfer of the transportable deployable profile 114. In such case, the operator of the deployable system 106 may provide confirmation of acceptance of the transfer via a user interface attached to the deployable system 106. In another example, an operator of the deployable system 106 may initiate transfer of the transportable deployable profile 114. In such case, the user of the device 108 may provide confirmation that the transportable deployable profile 114 is to be transferred via a user interface of the device 108.

At block 606, in response to the initiation, confirmation, or both, transportable deployable profile 114 is imported to the deployable system 106. The transportable deployable profile 114 may be decrypted and authenticated. Further, any validity period for the profile may be checked. The transportable deployable profile 114 may be discarded if authentication fails or if it is outside the validity period.

The decryption performed at block 606 corresponds to the encryption performed at block 508 (FIG. 5), and the description above may be referenced.

At block 608, the transportable deployable profile 114 is provisioned, such that the device 108 is granted access to the deployable system 106 as established by the profile 112. The method may be repeated for any number of wireless communications devices 108 to import transportable deployable profiles 114 of the devices 108 into the deployable system 106, as needed.

It should be apparent from the above that numerous other embodiments fall within the scope of this disclosure. In various embodiments, rather than separate device and user profiles, one transportable deployable profile is used for a wireless communications device to connect to a deployable system, where such a transportable deployable profile has some of all of the characteristics of the device and user profiles discussed herein. In various embodiments, a wireless communications device may carry profiles for one or more other devices. That is, an export service exports multiple different transportable deployable profiles to one device so that the device may output such profiles to a deployable system. This may allow for one device carry profiles for and facilitate provisioning of numerous other devices and users.

Systems and devices implemented according to this disclosure may provide various advantages. For example, a deployable system may not need to be pre-loaded with profiles for devices which may or may not ever use the deployable system. Each device may obtain and carry its own relatively current transportable deployable profile, so that if use of the deployable system is required, the device can provide its own transportable deployable profile. Further, the deployable system may be better able to handle unexpected devices and users, even devices and users who would not normally be expected to use the deployable system, provided they bear a valid transportable deployable profile.

In the foregoing specification, specific embodiments have been described. However, various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A deployable wireless communications system comprising:
   memory;
   an antenna;
   a processor connected to the memory and the antenna, the processor configured to execute instructions to control the antenna to provide a deployable wireless network to a plurality of wireless communications devices and to provide access for the plurality of wireless communications devices to the deployable wireless network according to profiles of each of the plurality of wireless communications devices stored in the memory; and
   an import service executable by the processor to import into the memory a profile carried by at least one wireless communications device of the plurality of wireless communications devices, the profile to provide access information for the at least one wireless communications device to the deployable wireless network, the import service including an open-service wide-area wireless network;
   wherein the profile is distinct from a wireless wide-area network profile stored in the memory of the at least one wireless communications device and used to access a wide-area wireless network.

2. The deployable wireless communications system of claim 1, further comprising a connection interface distinct from a wide-area wireless interface that uses the antenna, the import service to communicate with the at least one wireless communications device over the connection interface to import the profile.

3. The deployable wireless communications system of claim 1, wherein the profile is a device profile that defines device access information for the at least one wireless communications device on the deployable wireless network.

4. The deployable wireless communications system of claim 1, wherein the profile is a user profile that defines user access information for a user of the at least one wireless communications device.

5. The deployable wireless communications system of claim 1, wherein the import service is to import a plurality of profiles for the at least one wireless communications device including a device profile and a user profile.

6. The deployable wireless communications system of claim 1, wherein the profile is digitally signed by an export service of a backend system and the import service is to authenticate the profile as a condition to granting access of the at least one wireless communications device to the deployable wireless network.

7. A backend system comprising:
   memory;
   a processor connected to the memory, the processor to execute instructions to provide backend services to a plurality of wireless communications devices; and
   an export service executable by the processor to export from the memory a transportable deployable profile to a wireless communications device of the plurality of wireless communications devices, the transportable deployable profile to provide access for the wireless communications device to a deployable wireless network that is distinct from a wide-area wireless network that is accessible to the wireless communications device with a distinct wide-area wireless network profile, the export service further to export to the wireless communications device an updated version of the transportable deployable profile when changed.

8. The backend system of claim 7, wherein the export service is to export the transportable deployable profile via the wide-area wireless network.

9. The backend system of claim 7, wherein the export service is to export the transportable deployable profile to the wireless communications device automatically without user interaction.

10. The backend system of claim 7, wherein the export service is to export the transportable deployable profile to the wireless communications device in response to a user request received from the wireless communications device.

11. The backend system of claim 7, wherein the transportable deployable profile is a device profile that defines an identity for the wireless communications device on the deployable wireless network.

12. The backend system of claim 7, wherein the transportable deployable profile is a user profile that defines application access information for a user of the wireless communications device.

13. The backend system of claim 7, wherein the export service is to export a plurality of transportable deployable profiles for the wireless communications device including a device profile and a user profile.

14. The backend system of claim 7, wherein the export service is to digitally sign the transportable deployable profile.

15. The backend system of claim 7, wherein the export service is to encrypt the transportable deployable profile to make the transportable deployable profile unintelligible to the wireless communications device.

16. A wireless communications device comprising:
memory;
a secure module to store a wireless wide-area network profile and a deployable profile;
an antenna; and
a processor connected to the memory and the antenna, the processor to execute instructions to control the antenna to access a wide-area network using the wireless wide-area network profile, the instructions further to receive a transportable deployable profile from a backend export service including to receive an updated version of the transportable deployable profile when changed, the transportable deployable profile corresponding to the deployable profile, the instructions further to store the transportable deployable profile in the memory, and output the transportable deployable profile to a deployable wireless communications system, the deployable profile and the transportable deployable profile to provide access for the wireless communications device to a deployable wireless network that is provided by the deployable wireless communications system and that is distinct from the wide-area wireless network.

17. The wireless communications device of claim 16, further comprising a connection interface to connect to the deployable wireless communications system to output the transportable deployable profile to the deployable wireless communications system.

18. The wireless communications device of claim 16, wherein the instructions are further to receive, store, and output the transportable deployable profile as an encrypted block of data that is unintelligible to the wireless communications device.

19. The wireless communications device of claim 16, further comprising a user interface device connected to the processor, wherein the instructions are further to trigger a request for the transportable deployable profile from the backend export service in response to a user input at the user interface device.

* * * * *